(12) United States Patent
Fasano et al.

(10) Patent No.: US 7,772,318 B2
(45) Date of Patent: Aug. 10, 2010

(54) AQUEOUS POLYMER DISPERSIONS

(75) Inventors: David M. Fasano, Maple Glen, PA (US); Matthew S. Gebhard, New Britain, PA (US); Kathleen A. Koziski, Lansdale, PA (US); Willie Lau, Lower Gwynedd, PA (US); Aurelia C. Sheppard, Newtown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 1065 days.

(21) Appl. No.: 11/395,687

(22) Filed: Mar. 31, 2006

(65) Prior Publication Data

US 2006/0223935 A1 Oct. 5, 2006

Related U.S. Application Data

(60) Provisional application No. 60/668,178, filed on Apr. 4, 2005.

(51) Int. Cl.
*C09D 5/02* (2006.01)

(52) U.S. Cl. .................................. 524/501; 524/502

(58) Field of Classification Search ............ 524/501, 524/502
See application file for complete search history.

(56) References Cited

U.S. PATENT DOCUMENTS

| | | | |
|---|---|---|---|
| 4,062,823 A | 12/1977 | Cheung et al. | |
| 4,501,845 A | 2/1985 | Baus et al. | |
| 4,879,333 A | 11/1989 | Frazee | |
| 4,912,169 A | 3/1990 | Whitmire et al. | |
| 5,189,107 A | 2/1993 | Kasai et al. | |
| 5,236,991 A | 8/1993 | Makati et al. | |
| 5,292,842 A * | 3/1994 | Yang | 526/318.4 |
| 5,308,890 A * | 5/1994 | Snyder | 523/201 |
| 5,521,266 A | 5/1996 | Lau | |
| 5,710,226 A | 1/1998 | Lau | |
| 5,731,377 A | 3/1998 | Friel | |
| 5,760,129 A | 6/1998 | Lau | |
| 5,804,632 A | 9/1998 | Haddleton et al. | |
| 5,859,112 A | 1/1999 | Overbeek et al. | |
| 5,962,571 A | 10/1999 | Overbeek et al. | |
| 6,054,526 A | 4/2000 | Betremieux et al. | |
| 6,169,148 B1 * | 1/2001 | Deckers et al. | 525/333.8 |
| 6,596,804 B1 | 7/2003 | Edwards et al. | |
| 6,664,327 B2 * | 12/2003 | Daisey et al. | 524/523 |
| 7,144,945 B2 * | 12/2006 | Martin et al. | 524/501 |
| 2003/0224157 A1 * | 12/2003 | Matthews et al. | 428/327 |

FOREIGN PATENT DOCUMENTS

| | | |
|---|---|---|
| AU | 671485 B2 | 3/1994 |
| DE | 10300798 A1 | 7/2004 |
| EP | 466409 A1 * | 1/1992 |
| EP | 0822944 | 2/1998 |
| EP | 0854153 | 7/1998 |
| EP | 1138730 | 10/2001 |
| JP | 08-208727 A | 8/1996 |
| JP | 2001-151807 A | 6/2001 |
| WO | WO 97/09345 | 3/1997 |

OTHER PUBLICATIONS http://www.sigmaaldrich.com/img/assets/3900/Thermal_Transitions_of_Homopolymers.pdf, May 14, 2003.*

* cited by examiner

*Primary Examiner*—Satya B Sastri
(74) *Attorney, Agent, or Firm*—Cantor Colburn LLP; Robert Stevenson

(57) ABSTRACT

An aqueous polymer dispersion comprising polymer particles (A), polymer particles (B) and at least one low molecular weight polymer (C) where polymer particles (A) comprise high molecular weight polymer pA having Mw >50,000 and acid number of from 0 to 160, polymer particles (B) comprise high molecular weight polymer pB having Mw >50,000 and acid number of from 0 to 160, and C is an addition polymer having a calculated $T_g$,(low) of less than 10° C., Mn <10,000, acid number of from 0 to 80, formed by the polymerization of at least one ethylenically unsaturated nonionic monomer.

16 Claims, No Drawings

AQUEOUS POLYMER DISPERSIONS

This non-provisional patent application is claiming priority based on U.S. Provisional Patent Application No. 60/668,178, filed on Apr. 4, 2005, the disclosure of which is incorporated herein by reference.

This invention is an aqueous polymer dispersion useful in coatings. More particularly, the invention relates to aqueous polymer dispersions where multiple types of polymeric component are present.

In today's paint latex paint market, there is a drive to reduce volatile organic compound ("VOC") content in formulated paints. A common way to accomplish this is to reduce the amount of coalescent in the polymeric binder used in latex paint. The coalescent is commonly used to soften the polymeric binder so that after the paint is applied and the water evaporates, the polymeric binder particles can flow together to form a good film. After flow, the coalescent evaporates, leaving a hard polymer film. Some classify the evaporated coalescent as a VOC.

Reducing the amount of coalescent by itself is undesirable because flow would be impeded, resulting is a coating that might not form a continuous film or that might have poor appearance. To allow good film formation with reduced coalescent content, one common approach is to use a softer polymer (i.e., lower Tg) for the binder. Flow can be quite good with a lower Tg, but it sacrifices other properties, most notably scrub resistance.

This invention by contrast is a polymer dispersion that can be used in low VOC paint formulations with little, if any, sacrifice in other properties.

European Patent 0854153 discloses coating compositions comprising emulsion polymers having from 40% to 90% by weight of a first polymer having a Tg of from 0° C. to 60° C.; and from 10% to 60% by weight of a second polymer having a Tg of from 10° C. to 100° C., provided that the Tg of the second polymer is at least 10° C. higher than the Tg of the first polymer, and provided that the first polymer is higher in molecular weight than the second polymer, such that when both polymers are combined the composition has a bimodal molecular weight distribution wherein from 5% to 40% by weight of the total polymer has a molecular weight greater than 255,000 and greater than 30% by weight of the total polymer has a molecular weight below 52,000.

One aspect of the invention is an aqueous polymer dispersion comprising polymer particles (A), polymer particles (B) and at least one low molecular weight polymer (C) where,
 a) polymer particles (A) comprise high molecular weight polymer pA having Mw >50,000 and acid number of from 0 to 160,
 b) polymer particles (B) comprise high molecular weight polymer pB having Mw >50,000 and acid number of from 0 to 160,
 c) C is an addition polymer having a calculated Tg,(low) of less than 10° C., Mn <10,000, acid number of from 0 to 80, formed by the polymerization of at least one ethylenically unsaturated nonionic monomer, wherein
 d) the weight percentage of pA, based on the total weight of polymer in said dispersion, is at least 5%,
 e) the weight percentage of (C) is at least 5%, based on the total weight of pA,
 f) pA is formed in the presence of (C) or (C) is formed in the presence of pA, and
 g) polymer particles (A) differ from polymer particles (B) in at least one of; particle size, Tg, acid number, composition, molecular weight, molecular weight distribution, polymer chain structure.

Another non-limiting and alternative aspect of the invention is an aqueous polymer dispersion as defined above formed by the blending of an aqueous dispersion comprising pA and (C) with an aqueous dispersion comprising pB.

Another non-limiting and alternative aspect of the invention is an aqueous polymer dispersion as defined above wherein pB is formed by polymerization of at least one ethylenically unsaturated monomer in the presence of an aqueous dispersion comprising pA and (C).

Yet another non-limiting and alternative aspect of the invention is an aqueous polymer dispersion as defined above wherein the Mn of C is <7,500.

Yet another non-limiting and alternative aspect of the invention is an aqueous polymer dispersion as defined above wherein the Mn of C is <4,000.

Yet another non-limiting and alternative aspect of the invention is an aqueous polymer dispersion as defined above wherein the calculated $Tg\infty$ of pA differs from the calculated $Tg\infty$ of pB by at least 10° C.

Yet another non-limiting and alternative aspect of the invention is an aqueous polymer dispersion as defined above wherein the number average particle size of polymer particles (A) differs from that of polymer particles (B) by at least 50 nanometers.

Yet another non-limiting and alternative aspect of the invention is an aqueous polymer dispersion as defined above wherein (C) is formed in the presence of a macromolecular organic compound having a hydrophobic cavity.

Yet another non-limiting and alternative aspect of the invention is an aqueous polymer dispersion as defined above wherein particles (A), polymer particles (B) and at least one low molecular weight polymer (C) wherein,
 a) polymer particles (A) comprise high molecular weight polymer pA having Mw >50,000, acid number of from 0 to 160, and calculated $Tg\infty$ of at least 40° C.,
 b) polymer particles (B) comprise high molecular weight polymer pB having Mw >50,000, acid number of from 0 to 160 and calculated $Tg\infty$ of –10 to 30° C.,
 c) C is an addition polymer having a calculated Tg,(low) of less than 10° C., Mn <10,000, acid number of from 0 to 80, formed by the polymerization of at least one ethylenically unsaturated nonionic monomer, wherein
 d) the weight percentage of pA, based on the total weight of polymer in said dispersion, is at least 5%,
 e) the weight percentage of (C), based on the total weight of polymer in the dispersion, is at least 1%.

Yet another non-limiting and alternative aspect of the invention is a coating composition comprising an aqueous dispersion according to any of the preceding claims.

It has surprisingly been found that the performance of aqueous based coatings can be enhanced when produced with aqueous polymer dispersions comprising very low molecular weight polymer and two or more types of particles comprising high molecular weight polymer. More specifically, it has been found that aqueous dispersions of this type provide an unexpected level of performance improvement when very low molecular weight polymer is present in at least one of the types of particles comprising high molecular weight polymer.

All ranges defined herein are inclusive and combinable.

As used herein, the term "dispersion" refers to a physical state of matter that includes at least two distinct phases, wherein a first phase is distributed in a second phase, with the second phase being a continuous medium. An aqueous polymer dispersion is a dispersion containing a first phase distributed in an aqueous second phase that is predominately water and may contain minor amounts of water soluble or water-miscible liquids, such as lower alkyl alcohols, ketones, or glycols.

As used herein, "population of polymer particles" refers to a subset of polymer particles having a set of defining characteristics, such as physical properties, chemical composition, and morphology. Examples of physical properties include particle diameter, density, surface functional groups such as acid groups, glass transition temperature, molecular weight, and molecular weight distribution. Examples of chemical composition include the average content of polymerized monomers contained in the polymer particles, the random arrangement of polymerized monomers as contained in random copolymers, comb graft polymers, the inclusion of polymer units of a select ethylenically unsaturated monomer in one mode of polymer particles but not in the second mode of polymer particles, and the arrangement of polymerized monomers in block copolymers, such as size of blocks or sequencing of blocks. Examples of polymer morphology include single phase polymer particles, core-shell polymer particles such as particles having one or more polymer shells that either fully or partially encapsulate a polymer core, polymer particles having a continuous phase of a first polymer with multiple domains of a second polymer, interpenetrating network polymers, polymer particles having one or more internal voids, macro-reticulated particles having one or more internal voids and at least one channel connecting a void with the exterior surface of the polymer particles, and polymer particles having one or more polymer lobes attached to center polymer particles.

Unless otherwise specified, the term particle size as used herein refers to the number average particle diameter as determined using a capillary hydrodynamic fractionation apparatus, such as the Matec CHDF-2000 apparatus (Matec Applied Sciences, Mass.) with ultraviolet detection at 200 nm. Particle size standards are provided by National Institute of Standards and Technology (NIST) traceable polystyrene standards of 50 to 800 nm, such as supplied by Duke Scientific Corporation, CA.

Unless otherwise specified, the term Mn, as used herein, refers to the number average molecular weight as determined by size exclusion chromatography (SEC) using EasiCal PS-2® polystyrene standards supplied by Polymer Laboratories.

Unless otherwise specified the term Mw, as used herein, refers to the weight average molecular weight as determined by SEC using EasiCal PS-2® polystyrene standards supplied by Polymer Laboratories.

As used herein, the term "acid number" refers to the number of milligrams of KOH necessary to neutralize the free acid present in one gram of a substance. So, for example, a polymer comprising 1% by weight, based on the total weight of the polymer, polymerized residues of methacrylic acid has an acid number of 6.5.

The term "Tg,∞" as used herein refers to the glass transition temperature of high molecular weight polymers, high molecular weight being Mw 50,000 or greater, as determined using the Fox equation (T. G. Fox, Bull. Am. Physics Soc., Volume 1, Issue No. 3, page 123 (1956)). that is, for calculating the Tg Tg,∞ of a copolymer of monomers M1 and M2, $$1/Tg,\infty = w(M1)/Tg(M1) + w(M2)/Tg(M2),$$

wherein

Tg,∞ is the glass transition temperature calculated for the copolymer w(M1) is the weight fraction of monomer M1 in the copolymer w(M2) is the weight fraction of monomer M2 in the copolymer Tg(M1) is the glass transition temperature of the high molecular weight homopolymer of M1

Tg(M2) is the glass transition temperature of the high molecular weight homopolymer of M2, all temperatures being in ° K.

For copolymers of Mw 50,000 or greater comprising more than two types of monomers, and optionally chain transfer agent (CTA), the calculation may be expressed as, $$1/Tg,\infty = \Sigma[w(Mi)/Tg,(Mi)]$$

where w(Mi) is the weight fraction of each monomer or CTA, and Tg,(Mi) is the high molecular weight Tg of a homopolymer made from each monomer or CTA.

The glass transition temperatures of homopolymers are those in "Polymer Handbook," 4$^{th}$ edition edited by J. Brandrup, E. H. Immergut, and E. A. Grulke, Wiley-Interscience Publishers (1999). If more than one glass transition temperature is reported, the average of the reported values is used. Additionally, the contribution of the chain transfer agents ("CTA") must be included as it is an appreciable component in the polymer. An estimate of the contribution from mercaptan CTAs can be made from the Tgs of poly(thioalkylene) listed in Brandrup et. al. These materials have Tgs near 230° K, thus this value is used as an estimate for the Tg for mercaptan CTA.

The term "Tg, (low)", as used herein, refers to the glass transition temperature of polymers with measured Mn of 10,000 or below, as determined using the Fox equation with a factor adjusting for the effect of low molecular weight on the Tg of a polymer. Tg,(low) is determined using the calculation $$Tg,(\text{low}) = Tg,\infty - K/Mn$$

based on that given by T. G. Fox and P. J. Flory, J. Appi. Phys., 21, 581 (1950), where Tg,∞ is the glass transition temperature of the high molecular weight polymer, K is a fitting parameter, and Mn is the measured number-average molecular weight as described herein.

For the inventive dispersions K=300×Tg,∞

By "measured Tg," as used herein, is meant the glass transition temperature as determined by differential scanning calorimetry (DSC) using a heating rate of 10° C./minute, taking the mid-point in the heat flow versus temperature transition as the Tg value.

As used herein, the use of the term "(meth)" followed by another term such as acrylate refers to both acrylates and methacrylates. For example, the term "(meth)acrylate" refers to either acrylate or methacrylate; the term "(meth)acrylic" refers to either acrylic or methacrylic; the term "(meth)acrylic acid" refers to either acrylic acid or methacrylic acid; and the term "(meth)acrylamide" refers to either acrylamide or methacrylamide.

The high molecular weight polymers pA and pB of the invention include polymers formed by the polymerization of one or more ethylenically unsaturated monomers, condensation polymers, hybrid polymers containing both condensation polymer and addition polymer. Condensation polymers are polymers that are not formed by the addition polymerization of ethylenically unsaturated monomers, and include, for example, polyurethanes, polyureas, polyesters, polyamides, alkyds, polycarbonates, polysilicones such as the condensation product of hexamethylcyclotrisiloxane ($D_3$); octamethylcyclotetrasiloxane ($D_4$), and decamethylcyclopentasiloxane ($D_5$); polyalkyl oxides such as polyethylene oxide; polyimides; polysulfones; polyacetals; and biopolymers such as polyhydroxy alkanoates, polypeptides, and polysaccharides.

High molecular weight polymers formed by the polymerization of one or more ethylenically unsaturated monomers may be polymerized by any means known in the art including solution, emulsion, miniemulsion, microemulsion, or suspension polymerization processes. Preferred is emulsion or miniemulsion. The practice of emulsion polymerization is discussed in detail in D. C. Blackley, *Emulsion Polymerization* (Wiley, 1975) and H. Warson, *The Applications of Synthetic Resin Emulsions*, Chapter 2 (Ernest Benn Ltd., London 1972).

Miniemulsions are well known in the art as oil-in-water dispersions, with droplet diameter below 1 micron, that are stable for a period ranging from hours to months. Within the context of this invention, the droplets of the miniemulsion contain ethylenically unsaturated monomers and other optional components as needed to provide stable sub-micron droplets. These other optional components include compounds of very low water solubility and are referred in the art as co-surfactants, co-stabilizers, or hydrophobes. Typical hydrophobes include higher alkanes such as hexadecane, hydrophobic alcohols such as cetyl alcohol, very hydrophobic monomers such as stearyl methacrylate, and polymers. Miniemulsions are typically formed under high shear through the use of rotor-stator devices, sonifiers, and high pressure homogenizers. Miniemulsions are typically made using surfactants. Description of mini-emulsions and their use in emulsion polymerization can be found in "Miniemulsion Polymerization" by J. M. Asua in Progress in Polymer Science, Volume 27, Pages 1283-1346 (2002). In some embodiments the low molecular weight polymers (C) of the invention may serve as hydrophobes in a miniemulsion process.

In those embodiments of the invention utilizing emulsion or miniemulsion polymerization processes conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Either thermal or redox initiation processes may be used. The reaction temperature is typically maintained at a temperature lower than 100° C. throughout the course of the reaction. Preferred is a reaction temperature between 30° C. and 95° C., more preferably between 50° C. and 90° C. The monomer mixture may be added neat or as an emulsion in water. The monomer mixture may be added in one or more additions or continuously, linearly or not, over the reaction period, or combinations thereof.

When forming polymers of the invention by polymerization of ethylenically unsaturated monomers conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators (alternatively referred to as "oxidants" herein) coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, sodium 2-hydroxy-2-sulfinatoacetic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used.

Ethylenically unsaturated nonionic monomers useful to the invention include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, styrene, substituted styrenes, ethylene, butadiene; vinyl acetate, vinyl butyrate and other vinyl esters; vinyl monomers such as vinyl chloride, vinyl toluene, and vinyl benzophenone; and vinylidene chloride.

Ethylenically unsaturated acid monomers useful to the invention include, for example, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl (meth)acrylate, phosphoalkyl (meth)acrylates such as phosphoethyl (meth)acrylate, phosphopropyl (meth)acrylate, and phosphobutyl (meth)acrylate, phosphoalkyl crotonates, phosphoalkyl maleates, phosphoalkyl fumarates, phosphodialkyl (meth)acrylates, phosphodialkyl crotonates, and allyl phosphate.

In some embodiments of the invention polymers formed by the polymerization of ethylenically unsaturated monomers may contain copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene.

In some embodiments of the invention it may desirable to incorporate into one or more of the polymeric components functional monomers which impart specialized performance to the aqueous dispersion. An example would be the inclusion of monomers bearing functional groups which impart improved adhesion to alkyd substrates. Ethylenically unsaturated monomers bearing such functional groups include vinyl acetoacetate, acetoacetoxyethyl (meth)acrylate, acetoacetoxypropyl (meth)acrylate, allyl acetoacetate, acetoacetoxybutyl (meth)acrylate, 2,3-di(acetoacetoxy)propyl (meth)acrylate, vinyl acetoacetamide, acetoacetoxyethyl (meth)acrylamide, 3-(2-vinyloxyethylamino)-propionamide, N-(2-(meth)acryloxyethyl)-morpholinone-2,2-methyl-1-vinyl-2-imidazoline, 2-phenyl-1-vinyl-2-imidazoline, 2-(3-oxazolidinyl)ethyl (meth)acrylate, N-(2-vinoxyethyl)-2-methyloxazolidine, 4,4-dimethyl-2-isopropenyloxazoline, 3-(4-pyridyl)propyl (meth)acrylate, 2-methyl-5-vinyl-pyridine, 2-vinoxyethylamine, 2-vinoxyethylethylene-diamine, 3-aminopropyl vinyl ether, 2-amino-2-methylpropyl vinyl ether, 2-aminobutyl vinyl ether, tert-butylaminoethyl (meth) acrylate, 2-(meth)acryloxyethyldimethyl-β-propiobetaine, diethanolamine monovinyl ether, (meth)acryloxyacetamidoethylethyleneurea, ethyleneureidoethyl (meth)acrylate, (meth)acrylamidoethyl-ethyleneurea, (meth)acrylamidoethyl-ethylenethiourea, N-((meth)acrylamidoethyl)-N-(1-hydroxymethyl)ethyleneurea, o-aniline vinyl thioether, N-((meth)acrylamidoethyl)-N-(1-methoxy)methylethyleneurea, N-formamidoethyl-N-(1-vinyl)ethyleneurea, N-vinyl-N-(1-aminoethyl)-ethyleneurea, N-(ethyleneureidoethyl)-4-pentenamide, N-(ethylenethioureido-ethyl)-10-undecenamide, butyl ethyleneureido-ethyl fumarate, methyl ethyleneureido-ethyl fumarate, benzyl N-(ethyleneureido-ethyl) fumarate, benzyl N-(ethyleneureido-ethyl) maleamate, N-vinoxyethylethylene-urea, N-(ethyleneureidoethyl)-crotonamide, ureidopentyl vinyl ether, 2-ureidoethyl (meth)acrylate, N-2-(allylcarbamoto)aminoethyl imidazolidinone, 1-(2-((2-hydroxy-3-(2-propenyloxy)propyl)amino)ethyl)-2-imidazolidinone, hydrogen ethyleneureidoethyl itaconamide, ethyleneureidoethyl hydrogen itaconate, bis-ethyleneureidoethyl itaconate, ethyleneureidoethyl undecylenate, ethyleneureidoethyl undecylenamide, 2-(3-methylolimidazolidone-2-yl-1)ethyl acrylate, N-acryloxyalkyl oxazolidines, acylamidoalkyl vinyl alkyleneureas, aldehyde-reactive amino group-containing monomers as dimethylaminoethyl methacrylate, and ethylenically unsaturated monomers containing aziridine functionality.

Chain transfer agents such as, for example, halogen compounds such as tetrabromomethane; allyl compounds; or mercaptans such as alkyl thioglycolates, alkyl mercaptoalkanoates, and $C_4$-$C_{22}$ linear or branched alkyl mercaptans may be used to lower the molecular weight of the polymers formed by the polymerization of ethylenically unsaturated monomers and/or to provide a different molecular weight distribution than would otherwise have been obtained with any free-radical-generating initiator(s).

The inventive dispersions contain at least two populations of polymer particles, (A) and (B), each comprising at least one high molecular weight polymer, pA and pB, and at least one low molecular weight polymer (C).

In some embodiments of the invention pA is formed by the free radical polymerization of at least one ethylenically unsaturated nonionic monomer and from 0% to 25% by weight of at least one ethylenically unsaturated acid monomer, based on the total weight of pA. Optionally, pB may be formed in the same fashion. In such embodiments either or both of pA and pB may be formed in the presence of chain transfer agent to control molecular weight and/or gel fraction, gel fraction being that portion of the polymer insoluble in organic solvents. Either or both of pA and pB may be formed in the presence of multi-ethylenically unsaturated monomers which may increase the gel fraction of the polymer(s) and/or cause the polymer structure to be more branched.

pA and pB may differ in one or more characteristic(s), examples of such characteristics including molecular weight, molecular weight distribution, Tg, acid number, chemical composition, polymer chain structure. Polymer chain structure refers to the many possible configurations of monomer units within a polymer chain, such as linear polymer chains, branched polymer chains, random copolymer chains, block copolymers, comb graft polymers, atactic polymers, syndiotactic polymers, isotactic polymers. In saying that pA and pB differ in Tg, we mean that the calculated $Tg,\infty$ of pA and pB differ by at least 5° C. Specific advantage may observed when the calculated $Tg,\infty$ of pA and pB differ by at least 10° C.; preferably by at least 20° C. In saying that pA and pB differ in molecular weight, we mean that the Mw of pA and pB differ by more than 100,000. In saying that pA and pB differ in molecular weight distribution, we mean that the ratio Mw/Mn of pA differs from that of pB by at least 20%. In saying that pA and pB differ in acid number what is meant is that the acid number of pA and pB differ by at least a value of 5. When pA is comprised of the polymerized residues of at least one monomer not present in pB, or pB is comprised of the polymerized residues of at least one monomer not present in pA, pA and pB differ in chemical composition. Another way in which pA and pB may differ in chemical composition is when pA is formed from a monomer mixture in which the weight percentage of a given monomer (X), based on the total weight of the monomers used to form pA, is different by at least 5% from the weight percentage of a given monomer (X), based on the total weight of the monomers used to form pB. That is pA and pB are compositionally different if, for example, monomer (X) is present at a level of 6 weight % in the monomer mixture used to form pA, and monomer (X) is present at a level of 1 weight % or less, or 11 weight % or more, in the monomer mixture used to form pB.

In embodiments where one or more other aspect(s) of the particles of Population (A) differentiate them from the particles of Population (B), pA and pB may be the same. Examples of how (A) may be differentiated from (B) when pA and pB are the same include;

(1) Population (A) may have a different mean particle diameter than Population (B). Specific advantage may be observed when the mean particle diameters differ by at least 50 nm; preferably by at least 100 nm; more preferably by at least 150 nm.

(2) In addition to pA, particles of Population (A) may comprise other components than those found in the particles of Population (B). Examples of such other components include high molecular weight polymer, low molecular weight polymer, non-polymeric organic compounds, inorganic compounds.

(3) The concentration of (C) in particles (A) is preferably at least 1%; at least 2%; at least 5%, based on the total weight of polymer in particles (A), greater than the concentration of (C) in particles (B) based on the total polymeric content of (B). By "The concentration of (C) in particles (A) is at least 1% based on the total weight of polymer in particles (A), greater than the concentration of (C) in particles (B) based on the total polymeric content of (B)" is meant that when particles (B) comprise 1% polymer (C), based on the total polymeric content of (B), particles (A) comprise at least 2% polymer (C), based on the total polymeric content of (A).

The low molecular weight polymer, (C), of the invention is formed by the polymerization of one or more ethylenically unsaturated monomers. (C) has an acid number of 80 or less; 65 or less; 50 or less. The Tg,(low) of (C) is less than 10° C. In some preferred embodiments the Tg,(low) of (C) is less than 0° C.; less than −10° C. The Mn of polymer (C) is less than 10,000; preferably less than 7,500; more preferably less than 4,000. The Mn of polymer (C) is preferably at least 500; more preferably at least 750. The molecular weight of polymer (C) may be controlled by any means known to the art. In some embodiments, the chain transfer agent may be selected from mercaptans, polymercaptans, thioesters, halogenated compounds and combinations thereof. In some preferred embodiments the molecular weight of polymer (C) is controlled through the use of linear or branched $C_4$-$C_{22}$ alkyl mercaptans such as n-dodecyl mercaptan and t-dodecyl mercaptan. It is also contemplated that the molecular weight of polymer (C) may be controlled through the use of catalytic chain transfer agents, such as the cobalt compounds described in U.S. Pat. Nos. 5,962,609 and 4,746,713.

Polymer (C) may be formed by any means known in the art including bulk, solution, emulsion, miniemulsion, microemulsion, or suspension polymerization processes. Typically, polymer (C) is formed by the free radical initiated polymerization of one or more ethylenically unsaturated monomers though other forms of initiation, including anionic initiation, may be contemplated. In some embodiments polymer (C) can be formed by high temperature oligomerization processes as disclosed in U.S. Pat. No. 5,710,227. If polymer (C) is formed by means other than aqueous dispersion processes it may be converted to an aqueous dispersion by techniques known to the art.

Polymer (C) preferably has little or no solubility in water. By this we mean that the dissolved concentration of polymer (C) in water is no greater than 5 weight % at 25-50° C. at any pH between 2 and 12; preferably no greater than 2 weight %; and more preferably no greater than 0.1 weight %.

Polymer (C) is present in the aqueous dispersion at a level of at least 5%; at least 7%; at least 10%; at least 20% by weight based on the weight of pA. pA is present in the aqueous dispersion at a level of at least 5% by weight, based on the total weight of polymer in the aqueous dispersion. At least 20%; preferably at least 50%; and more preferably at least 90% of polymer (C) is present in the particles of at least one of (A) or (B). In cases where polymer (C) is fully compatible with the other polymers present in the particle a single measured Tg may be observed. In cases where some portion of polymer (C) is incompatible with other polymers present in the particle multiple measured Tg's may be observed. The presence of polymer (C) in particles comprising pA may result in a lowering of the apparent Tg of pA, as measured by DSC, relative to the Tg observed for pA in the absence of polymer (C). The lowering of the measured Tg of pA in the presence of polymer (C) may be at least 5° C.; preferably at least about 10° C.; and more preferably at least about 20° C.

In some preferred embodiments the aqueous dispersions of the invention comprise (1) particles (B) comprising at least one polymer pB, pB having a Tg,∞ of from −10° C. to 30° C.; 0° C. to 30° C.; 0° C. to 20° C.; and (2) particles (A) comprising at least one polymer pA, pA having a Tg,∞ of at least 40° C.; at least 50° C.; and (3) low molecular weight polymer (C) having Mn of 10,000 or less; 7,500 or less; 4000 or less; wherein pA is present at a level of 5 to 50%, by weight, based on the total weight of polymer in the dispersion, and (C) is present at a level of at least 1% by weight, based on the total weight of polymer in the dispersion.

In one embodiment of the invention at least one of high molecular weight polymer pA is formed in the presence of low molecular weight polymer (C). By "pA is formed in the presence of low molecular weight polymer (C)" is meant that the monomers comprising pA are caused to polymerize in a reaction vessel in which (C) is present. In some preferred embodiments pA is a polymer formed by aqueous emulsion polymerization of one or more ethylenically unsaturated monomers in the presence of low molecular weight polymer (C). This can be achieved by providing an aqueous dispersion of a low molecular polymer (C); adding one or more ethylenically unsaturated monomers to the dispersion of (C); causing the one or more ethylenically unsaturated monomers to polymerize by any means known to the art. Monomers may be added to the polymerization in a single charge and polymerized in a single batch, or shot fashion. Alternately the monomers may be added gradually as polymerization proceeds, frequently referred to as semi-continuous or continuous polymerization. In some embodiments it may be desirable to use some combination of shot and gradual addition techniques to form the high molecular weight polymer(s). In another embodiment of the invention a miniemulsion may be formed from a mixture comprising polymer (C) and one or more ethylenically unsaturated monomers, said monomers subsequently being caused to polymerize.

In another embodiment of the invention the low molecular weight polymer (C) may be formed in the presence of high molecular weight polymer pA. By "low molecular weight polymer (C) is formed in the presence of high molecular weight polymer pA" is meant that the monomers comprising (C) are caused to polymerize in a reaction vessel in which pA is present. In some preferred embodiments the monomer(s) used to form (C) and chain transfer agent(s) are combined with an aqueous dispersion comprising pA, said monomer(s) subsequently being caused to polymerize. The monomer(s) and/or chain transfer agent(s) may be added to the aqueous dispersion in a single charge and polymerized in a single batch, or shot fashion. Alternately the monomer(s) and/or chain transfer agent(s) may be added gradually as polymerization proceeds, frequently referred to as semi-continuous or continuous polymerization. In some embodiments it may be desirable to use some combination of shot and gradual addition techniques to form polymer (C).

In some embodiments the inventive dispersions may be formed by blending an aqueous dispersion comprising pA and (C) with an aqueous dispersion comprising pB. By blending is meant any means of combining or mixing at least an aqueous dispersion comprising pA and (C) with an aqueous dispersion comprising pB. Means of blending may include adding a dispersion comprising pA and (C) to an aqueous dispersion comprising pB or by adding a dispersion comprising pB to a dispersion comprising pA and (C). The dispersions may be combined in batch, semicontinuous, or continuous fashion.

In some embodiments polymer particles (B) may be formed by polymerization of at least one ethylenically unsaturated monomer in the presence of a first aqueous dispersion comprising pA and (C), to form a second aqueous dispersion. Examples of such embodiments include those means typically used to form new particles in an aqueous dispersion of pre-existing particles. Such means are often discussed in the context of forming aqueous dispersions having bimodal or multi-modal particle size distributions, though the inventive dispersion formed by these means need not have bimodal or multi-modal particle size distributions. By aqueous dispersion having bimodal or multi-modal particle size distribution herein is meant a dispersion comprising two or more populations of particles, each population having a distribution of particle sizes forming a peak observable by CHDF. Particle size distributions of these populations may overlap to some extent. The formation of polymer particles (B) in a first aqueous dispersion comprising pA and (C) may be aided by the addition of seed polymers, surfactant, miniemulsion, or pH adjusting agents such as buffers, to the first aqueous dispersion. In the case of addition of miniemulsion, said miniemulsion may comprise monomers used to form pB. Such additions may be made prior to or during the addition, to the first aqueous dispersion, of the monomer(s) used to form pB, said monomers being caused to polymerize in the presence of the first aqueous dispersion.

In some such embodiments the presence of new particles (B) in the second aqueous dispersion may be observed as the presence of at least one more particle size population in the second dispersion than was present in the first aqueous dispersion. For example the first aqueous dispersion may have a single particle size population with a peak centered at 100 nm, and the second aqueous dispersion may have two peaks, centered at 150 nm and the other at 250 nm. In other embodiments the formation of new particles (B) may be observed when the measured final particle size of the second aqueous dispersion is at least 10%; at least 20% smaller than the calculated theoretical final particle size when the calculation assumes that no new particles are formed during the formation of pB. In some such embodiments it may be desirable to minimize or control the amount of pB that is formed in or on particle (A). One way in which this can be achieved is the addition of a hydrophobic polymerization blocker, as disclosed in published US Patent Application No. US20050014883 A1, to an aqueous dispersion comprising pA and (C) where the hydrophobic polymerization blocker is added prior to the addition of at least some portion of the monomer(s) used to form pB.

The hydrophobic polymerization blocker is a material that minimizes the rate of polymerization or prevents polymerization of the ethylenically unsaturated monomer. The hydrophobic polymerization blocker may prevent free radical polymerization by combining with and removing free radicals, resulting in the termination of free radical reactions; or by combining with reactive free radicals to form stable free radicals having low reactivity.

The ability of a material to function as the hydrophobic polymerization blocker in the process of this invention is ascertained by the following test method, which compares polymerization in the presence and in the absence of the hydrophobic polymerization blocker. In the first sample, 20 grams of the ethylenically unsaturated monomer that is to be polymerized in the presence of the first polymer particles, is added to a pressure vessel with 0.02 grams of di-t-butylperoxide. The vessel is purged with nitrogen gas for 15 minutes, sealed, and then maintained at a temperature of 150° C. for a period of one hour. The contents of the vessel are immediately cooled to room temperature and then discharged into a volume of ice cold methanol that is 20 times the volume of the monomers. The resulting polymer solids are vacuum filtered on a 70 to 100 micron sintered glass funnel (Ace Glass, medium flow type B), dried, and weighed to determine the weight of polymer formed. The same procedure is employed in the second sample except that 0.4 grams of the material to be tested as the hydrophobic polymerization blocker is also added. A polymer yield of the second sample that is less than 90 weight % of the polymer yield of the first sample indicates that the tested material is a hydrophobic polymerization blocker.

Examples of hydrophobic polymerization blockers include polymerization inhibitors, polymerization retarders, and hydrophobic chain transfer agents. Polymerization inhibitors are materials that prevent polymerization by terminating free radical reactions, and include, for example, N-oxide radicals such as 2,2,6,6-tetramethyl-1-piperidinyloxy free radical and 2,6-di-tert-butyl-α-(3,5-di-tert-butyl-4-oxo-2,5-cyclohexadien-1-ylidene) p-tolyloxy, free radical (galvinoxyl free radical); phenol; alkyl phenol; catechols, polyaromatics such as naphthalene, anthracene, and pyrene; substituted polyaromatics such as hydroxynaphthalene and hydroxyanthracene; p-benzoquinone, and p-naphthaquinone. Polymerization retarders are materials that reduce the rate of free radical reactions, and include, for example, esters of unsaturated fatty acids such as alkyl, hydroxy alkyl, or alkoxy esters of linoleic or linolenic acid; C1 to C12 derivatives of dithiobenzoic acid such as dithiobenzoic acid phenyl ester, dithiobenzoic acid benzyl ester, dithiobenzoic acid cumyl ester, and inhibitory monomers. Inhibitory monomers are ethylenically unsaturated monomers that have a ceiling temperature that is below the polymerization temperature of the ethylenically unsaturated monomers or is capable of radical capture without sustantial subsequent polymerization. The ceiling temperature is the temperature at which the rate of polymerization equals the rate of depolymerization for a monomer. Examples of inhibitory monomers include 1-alkyl styrenes such as a-methyl styrene; 1-aryl styrenes such as 1,1-diphenylethylene; 2-alkyl or 2-aryl styrenes such as stilbene and 1-phenylpentene; alkyl vinyl ethers; aryl vinyl ethers; trans-crotonitrile; trans-1,2-diphenylethylene; trans-1,2-dibenzoylethylene; trans-1,2-diacetylethylene; methyl 2-tert-butylacrylate; 1-isopryenylnaphthalene; α-stilbazole; 2,4-dimethyl α-methyl styrene; isoprenyltoluene; and half or full esters of itaconic acid, maleic acid, fumaric acid, and crotonic acid. Hydrophobic chain transfer agents include, for example, n-dodecyl mercaptan, 1,4-cyclohexadiene, terpineol, carbon tetrachloride, trichloromethane, benzyl halides; allyl halides, and crotyl halide. One or more polymerization blockers may be added to the aqueous medium. Examples of ranges of hydrophobic polymerization blocker that are suitable in the process of this invention include 0.1 to 10 weight %, 0.2 to 5 weight %, and 0.5 to 3 weight %, based on the weight polymer in the aqueous dispersion at the time of addition of the hydrophobic polymerization blocker.

In some embodiments it may be desirable to form any of the group of polymers pA, pB and (C) by free radical aqueous polymerization in the presence of a macromolecular organic compound having a hydrophobic cavity, as disclosed in U.S. Pat. No. 5,521,266. The macromolecular organic compound having a hydrophobic cavity useful in the method of the invention include cyclodextrin and cyclodextrin derivatives; cyclic oligosaccharides having a hydrophobic cavity such as cycloinulohexose, cycloinuloheptose, and cycloinuloctose; calyxarenes; and cavitands.

The cyclodextrin and cyclodextrin derivatives useful in the method of the invention are limited only by the solubility of the cyclodextrin and cyclodextrin derivative selected under the particular polymerization conditions. Suitable cyclodextrins useful in the method of the present invention include, but are not limited to, a-cyclodextrin, b-cyclodextrin and g-cyclodextrin. Suitable cyclodextrin derivatives useful in the method of the present invention include, but are not limited to, the methyl, triacetyl hydroxypropyl and hydroxyethyl derivatives of a-cyclodextrin, b-cyclodextrin and g-cyclodextrin. The preferred cylodextrin derivative is methyl-b-cyclodextrin.

The cyclic oligosaccharides having a hydrophobic cavity, such as cycloinulohexose, cycloinuloheptose, useful in the method of the invention are described by Takai et al., Journal of Organic Chemistry, 1994, volume 59, number 11, pages 2967-2975.

The calyxarenes useful in the method of the invention are described in U.S. Pat. No. 4,699,966, International Patent Publication WO 89/08092 and Japanese patent publications 1988/197544 and 1989/007837.

The cavitands useful in the method of the invention are described in Italian patent application no. 22522 A/89 and Moran et al., Journal of the American Chemical Society, volume 184, 1982, pages 5826-5828.

The use of a macromolecular organic compound having a hydrophobic cavity will be particularly useful when any of pA, pB, or (C) are formed by aqueous free radical polymerization and when one or more of the monomers and/or chain transfer agents used in the polymerization has a water solubility at 25-50° C. of no greater than 200 millimoles/liter; no greater than 50 millimoles/liter.

When any of pA, pB, or polymer (C) are formed by aqueous free radical polymerization and when one or more of the monomers and/or chain transfer agents used in the polymerization has a water solubility at 25-50° C. of no greater than 200 millimoles/liter; no greater than 50 millimoles/liter it may also be useful to introduce the monomers and/or chain transfer agents to the polymerization in the form of a monomer emulsion with an average droplet size of less than 50; less than 25 microns.

In some preferred embodiments the inventive aqueous polymer dispersion comprising two populations of polymer particles (A) and (B) and at least one low molecular weight polymer (C) where; polymer particles (A) comprise high molecular weight polymer pA having Mw >50,000 and acid number of from 0 to 160; polymer particles (B) comprise high molecular weight polymer pB having Mw >50,000 and acid number of from 0 to 160; C is an addition polymer having a calculated Tg,(low) of less than 10° C., Mn <10,000, acid number of from 0 to 80, formed by the polymerization of at least one ethylenically unsaturated nonionic monomer, wherein, the weight percentage of pA, based on the total weight of polymer in said dispersion, is at least 5%; at least 20% of (C) is present in Polymer particles A; the weight percentage of (C) in Polymer particles A is at least 5%, based on the total weight of the polymeric content of Polymer particles (A); and the weight percentage of (C) in Polymer particles A), based on the total weight of the polymeric content of Polymer particles (A), is greater than the weight percentage of (C) in polymer particles (B), based on the total weight of the polymeric content of Polymer particles (B), by at least 1%. "The weight percentage of (C) in Polymer particles A), based on the total weight of the polymeric content of Polymer particles (A), is greater than the weight percentage of (C) in polymer particles (B), based on the total weight of the polymeric content of Polymer particles (B), by at least 1%" means, for example, that when the weight percentage of (C) in particles (A) is 5% the weight percentage of (C) in particles (B) may range from 0 to 4%, when the weight percentage of (C) in particles (A) is 20% the weight percentage of (C) in particles (B) may range from 0 to 19%.

The inventive dispersions are particularly useful in the formation of aqueous coating compositions. In the formation of aqueous coating compositions other materials are optionally added to the inventive polymer dispersions including rheology modifiers; coalescents; solvents; biocides; wetting agents; defoamers; dyes; humectants; waxes; surfactants; fillers or extenders; colorants; flatting agents; neutralizers; buffers; freeze-thaw additives; plasticizers; antifoaming agents; tackifiers; hindered amine light stabilizers; UV absorbers such as benzophenone, substituted benzophenones, and substituted acetophenones; dispersants; anti-oxidants; and pigments. Examples of suitable pigments and extenders include titanium dioxide such as anatase and rutile titanium dioxides; zinc oxide; antimony oxide; iron oxide; magnesium silicate; calcium carbonate; organic and inorganic colored pigments; aluminosilcates; silica; various clays such as kaolin and delaminated clay; and lead oxide. It is also contemplated that the aqueous polymer blend composition optionally contains opaque polymer particles, such as, for example, Ropaque™ Opaque Polymers (Rohm and Haas Co., Philadelphia Pa.), which are useful for further improving the dry hiding of coating prepared from the aqueous polymer blend composition of this invention. It is also contemplated that extender particles with low oil absorption values are optionally added to the aqueous polymer blend composition of the invention, such as, for example, Expancel™ 551 DE20 acrylonitrile/vinyl chloride expanded particles (Expancel Inc., Duluth Ga.); Sil-Cell™ 35/34 sodium potassium aluminum silicate particles (Silbrico Corporation, Hodgkins Ill.); Dualite™ 27 polyvinylidene chloride copolymer coated with $CaCO_3$ (Pierce and Stevens Corporation, Buffalo N.Y.); Fillitte™ 150 ceramic spherical particles (Trelleborg Fillite Inc., Norcross Ga.); Microbeads™ 4A soda lime particles (Cataphote Inc.); Sphericell™ hollow glass particles (Potter Industries Inc. Valley Forge Pa.); Eccosphere™ hollow glass spheres (New Metals & Chemicals Ltd.; Essex England); Z-light™ Sphere W-1200 ceramic hollow spheres (3M, St. Paul, Minn.); Scotchlite™ K46 glass bubbles (3M, St. Paul, Minn.); Vistamer™ UH 1500 polyethylene particles and Vistamer™ HD 1800 polyethylene particles (Fluoro-Seal Inc, Houston Tex.).

The amounts of pigment and extender in the aqueous polymer blend composition vary from a pigment volume concentration (PVC) of 0 to 85 and thereby encompass coatings otherwise described in the art, for example, as clear coatings, stains, flat coatings, satin coatings, semi-gloss coatings, gloss coatings, primers, textured coatings, and the like. The pigment volume concentration is calculated by the following formula:

$$PVC(\%) = \frac{\text{volume of pigments}(s), +\text{volume extender}(s) \times 100}{\text{total dry volume of paint}}.$$

Frequently a VOC is deliberately added to a paint or coating to improve the film properties of a coating or to aid in the application properties of the composition employed to prepare the coating. Examples are glycol ethers, organic esters, aromatic compounds, ethylene and propylene glycol, and aliphatic hydrocarbons. The inventive dispersions are particularly useful in the formation of aqueous coating compositions having less than 5% VOC; less than 3% VOC; less than 1.7% VOC by weight based on the total weight of the aqueous coating composition. A volatile organic compound ("VOC") is defined herein as a carbon containing compound that has a boiling point below 280° C. at atmospheric pressure, compounds such as water and ammonia being excluded from VOCs.

In preferred embodiments, an aqueous coating composition comprising the inventive dispersions has a PVC of less than or equal to 38 and has less than 5% VOC; less than 3% VOC by weight; less than 1.7% VOC by weight, based on the total weight of the aqueous coating composition. In another preferred embodiment, an aqueous coating composition comprising the inventive dispersions has a PVC of greater than 35 and has less than 3% VOC by weight; less than 1.7% VOC by weight, based on the total weight of the aqueous coating composition. In an additional embodiment an aqueous coating composition comprising the inventive dispersions has a PVC of less than or equal to 85 and has less than 1.7% VOC by weight; less than 0.5% by weight; less than 0.1% by weight, based on the total weight of the aqueous coating composition.

In some embodiments wherein the inventive dispersions are used in the formation of aqueous coating compositions having VOC of 5% or less it is preferred that the inventive dispersion be comprised of (1) particles (B) comprising at least one polymer pB, pB having a Tg,∞ of from −10° C. to 30° C.; 0° C. to 30° C.; 0° C. to 20° C.; and (2) particles (A) comprising at least one polymer pA, pA having a Tg,∞ of at least 40° C.; at least 50° C.; and (3) low molecular weight polymer (C) having Mn of 10,000 or less; 7,500 or less; 4000 or less; wherein (C) is formed by polymerization of one or more ethylenically unsaturated monomers in the presence of an aqueous dispersion comprising pA or pA is formed by polymerization of one or more ethylenically unsaturated monomers in the presence of an aqueous dispersion comprising (C) and (C) is present at a level of at least 5% by weight based on the total weight of (A)+(B)+(C), and the ratio of the weight of [polymers pB+(C)] to the weight of [polymers pA] is from 2:3 to 19:1; from 1:1 to 19:1; from 3:2 to 19:1.

Examples of some embodiments of the invention follow.

TABLE

Abbreviations

| Abbreviation | |
|---|---|
| APS | ammonium persulfate |
| BA | butyl acrylate |
| CHDF | capillary hydrodynamic fractionation |
| DBS | dodecyl benzene sulfonate, supplied as 22% solids. |
| GC | gas chromatograph |
| HPLC | high performance liquid chromatography |
| Init. | initiator |
| AA | acrylic acid |
| MAA | Mmethacrylic acid |
| MMA | methyl methacrylate |
| Na2CO3 | sodium carbonate |
| NDDM | n-dodecylmercaptan |
| Sty | styrene |

For examples K1 through K4 particle size was determined by Brookhaven Instruments Corp. 90Plus Particle Size Analyzer. Solids were determined by weight loss after 40 minutes at 150° C. Molecular weight distribution was determined by GPC analysis on a Polymer labs Mixed C 300×7.5 mm column connected to an HP1100 auto-sampler and pump equipped with a Polymer Labs evaporative light scattering detector using polystyrene standards.

EXAMPLE K1

Preparation of Hard High Molecular Weight Polymer Via Emulsion Polymerization 458.76 grams BA, 1236.4 grams MMA, 22.4 grams AA, 1.72 NDDM, and 79 grams of a 30% aqueous solution of polyethylene glycol lauryl ether sodium sulfate were combined with 644 grams of deionized water and the mixture was agitated with a hand-held homogenizer for 30 seconds to form an emulsion. 896 grams of deionized water and 6.87 grams of a 30% aqueous solution of polyethylene glycol lauryl ether sodium sulfate were added to a 4 neck 5 liter round bottom glass kettle equipped with temperature control, condenser, and mechanical agitation. The kettle was heated to 85° C. under nitrogen while stirring. With the kettle temperature at 85° C., a 73 gram aliquot of the homogenized monomer emulsion was added to the kettle, immediately followed by 6.87 grams of APS dissolved in 20 grams of water. The resulting mixture was held with agitation for 5 minutes. The remaining monomer emulsion was then fed to the kettle over approximately 80 minutes while maintaining the reaction temperature at 85° C.

Upon completion of the monomer emulsion feed 61 grams of deionized water was added to the kettle, which was then held at 85° C. for an addition al 10 minutes before being allowed to cool to 60° C. 12.71 grams of 0.15 wt % iron sulfate solution was added to the kettle followed by the addition of 3.43 grams of 70% t-butyl hydroperoxide dissolved in 55.81 grams of water and 1.72 grams of Bruggolite FF6 dissolved in 55.81 grams of water over approximately 30 minutes. The kettle was allowed to cool to ambient temperature. At 30° C., the pH of the emulsion was adjusted to pH 9 by addition of ammonium hydroxide. The emulsion was removed from the kettle and filtered. The final latex was 49.9% solids, particle size was 119 nm, Mw was $2.8 \times 10^5$ g/mol with a polydispersity of 3.4.

EXAMPLE K2

Preparation of Soft High Molecular Weight Polymer Via Emulsion Polymerization

Example K2 was an approximately 1:1 blend of two identical batches prepared in the same manner as Example K1 with the exception that the monomers used consisted of 973.6 grams BA, 721.2 grams MMA, 22.4 grams AA, and 1.72 grams NDDM. The final latex resulting from the first batch was 48.5% solids, particle size was 117 nm, Mw, was $4.2 \times 10^5$ g/mol with a polydispersity of 6.1. The final latex resulting from the second batch was 48.4% solids, particle size was 119 nm, Mw was $4.8 \times 10^5$ g/mol with a polydispersity of 6.5.

EXAMPLE K3

Preparation of Low Molecular Weight Polymer Via Emulsion Polymerization 571.8 grams BA, 966.6 grams MMA, 20.3 grams AA, 155.9 grams NDDM, and 62.7 grams of a 30% aqueous solution of polyethylene glycol lauryl ether sodium sulfate were combined with 817 grams of deionized water and the mixture was agitated with a hand-held homogenizer for 30 seconds to form an emulsion. 863 grams of deionized water, 23.17 grams of a 30% aqueous solution of polyethylene glycol lauryl ether sodium sulfate, and 33.8 grams of a 50% solution of methyl-beta-cyclodextrin in water were added to a 4 neck 5 liter round bottom glass kettle equipped with temperature control, condenser, and mechanical agitation. The kettle was heated to 85° C. under nitrogen while stirring. With the kettle temperature at 85° C., a 77.3 gram aliquot of the homogenized monomer emulsion was added to the kettle, immediately followed by 6.87 grams of APS dissolved in 20 grams of water. The resulting mixture was held with agitation for 5 minutes. The remaining monomer emulsion was then fed to the kettle over approximately 120 minutes while maintaining the reaction temperature at 85° C.

Upon completion of the monomer emulsion feed 100 grams of deionized water was added to the kettle, which was then held at 85° C. for an addition al 10 minutes before being allowed to cool to 60° C. 12.71 grams of 0.15 wt % iron sulfate solution was added to the kettle followed by the addition of 4.58 grams of 70% t-butyl hydroperoxide dissolved in 55.81 grams of water and 2.29 grams of Bruggolite FF6 dissolved in 56.1 grams of water over approximately 30 minutes. The kettle was allowed to cool to ambient temperature. At 30° C., the pH of the emulsion was adjusted to pH 9 by addition of ammonium hydroxide. The emulsion was removed from the kettle and filtered. The final latex was 45.4% solids, particle size was 97 nm, Mw was $4.9 \times 10^3$ g/mol with a polydispersity of 2.0.

EXAMPLE K4

Preparation of Low Molecular Polymer in the Presence of a High Molecular Weight Polymer Via Emulsion Polymerization Monomer Emulsion #1

228.9 grams BA, 617.4 grams MMA, 11.4 grams AA, 0.92 grams NDDM, and 39.3 grams of a 30% aqueous solution of polyethylene glycol lauryl ether sodium sulfate were combined with 400.4 grams of deionized water and the mixture was agitated with a hand-held homogenizer for 30 seconds to form an emulsion.

Monomer Emulsion #2

286 grams BA, 483.7 grams MMA, 10.14 grams AA, 78 grams NDDM, and 39.5 grams of a 30% aqueous solution of polyethylene glycol lauryl ether sodium sulfate were combined with 400 grams of deionized water and the mixture was agitated with a hand-held homogenizer for 30 seconds to form an emulsion.

880 grams of deionized water and 6.87 grams of a 30% aqueous solution of polyethylene glycol lauryl ether sodium sulfate were added to a 4 neck 5 liter round bottom glass kettle equipped with temperature control, condenser, and mechanical agitation. The kettle was heated to 85° C. under nitrogen while stirring. With the kettle temperature at 85° C., a 77.3 gram aliquot of the homogenized monomer emulsion #1 was added to the kettle, immediately followed by 6.87 grams of APS dissolved in 20 grams of water. The resulting mixture was held with agitation for 5 minutes. The remaining monomer emulsion #1 was then fed to the kettle over approximately 40 minutes while maintaining the reaction temperature at 85° C. Upon completion of the monomer emulsion #1 feed 50 grams of deionized water and 33.8 grams of a 50% solution of methyl-beta-cyclodextrin in water were added to the reactor. Monomer emulsion #2 was then fed to the reactor over approximately 60 minutes. Upon completion of the monomer emulsion #2 feed 50 grams of deionized water were added to the kettle, which was then held at 85° C. for an addition al 10 minutes before being allowed to cool to 60° C. 12.71 grams of 0.15 wt % iron sulfate solution was added to the kettle followed by the addition of 4.58 grams of 70% t-butyl hydroperoxide dissolved in 53.77 grams of water and 2.29 grams of Bruggolite FF6 dissolved in 56.1 grams of water over approximately 30 minutes. The kettle was allowed to cool to ambient temperature. At 30° C., the pH of the emulsion was adjusted to pH 9 by addition of ammonium hydroxide. The emulsion was removed from the kettle and filtered. The final latex was 46.4% solids, particle size was 120 nm. Two peaks were detected in the molecular weight analysis; one peak represented a Mw of $2.3 \times 10^5$ g/mol with a polydispersity of 2.09, the other a Mw of $4.3 \times 10^3$ g/mol with a polydispersity of 2.1.

EXAMPLE K5

Preparation of Soft High Molecular Weight Polymer Via Emulsion Polymerization

The example is made in the same manner as Example K2 with the exception that 17.2 grams of MMA is replaced with 34.4 grams of a 50% solution of ureido methacrylate and 17.2 grams of deionized water is removed from the monomer emulsion mixture.

EXAMPLE K6

Preparation of Low Molecular Polymer in the Presence of a High Molecular Weight Polymer Via Emulsion Polymerization The example is made in the same manner as Example K4 with the exception that 8.6 grams of MMA in Monomer Emulsion #1 is replaced with 17.2 grams of a 50% solution of ureido methacrylate and 8.6 grams of deionized water is removed from Monomer Emulsion #1.

EXAMPLE K7

Preparation of Low Molecular Polymer in the Presence of a High Molecular Weight Polymer Via Emulsion Polymerization The example is made in the same manner as Example K4 with the exception that 7.8 grams of MMA in Monomer Emulsion #2 is replaced with 15.6 grams of a 50% solution of ureido methacrylate and 7.8 grams of deionized water is removed from Monomer Emulsion #2.

EXAMPLE K8

Preparation of Low Molecular Polymer in the Presence of a High Molecular Weight Polymer Via Emulsion Polymerization The example is made in the same manner as Example K4 with the exception that 8.6 grams of MMA in Monomer Emulsion #1 is replaced with 17.2 grams of a 50% solution of ureido methacrylate, 8.6 grams of deionized water is removed from Monomer Emulsion #1, 7.8 grams of MMA in Monomer Emulsion #2 is replaced with 15.6 grams of a 50% solution of ureido methacrylate, and 7.8 grams of deionized water is removed from Monomer Emulsion #2.

For Examples B 1 to B7, weight percent solids for the dispersions were determined by gravimetric analysis. Particle size of the polymers was obtained using a Matec CHDF 2000 particle size analyzer equipped with a HPLC type Ultra-violet detector.

Polymer number and weight average molecular weight were measured by SEC using a polystyrene standard from Polymer Laboratories (PS-1) having a peak average molecular weight ranging from 580 to 7,500,000 with narrow molecular weight distribution. Conversions from polystyrene to PMMA were made using Mark-Houwink constants. Copolymer compositions were evaluated for number average molecular weight and weight average molecular weight using SEC as described above.

EXAMPLES B1 TO B3

Preparation of High Molecular Weight Polymers by Emulsion Polymerization

The polymerization was conducted in a 3-liter, four neck round bottom reaction flask equipped with a mechanical stirrer, temperature control device, condenser, monomer feed line, initiator feed line, and a nitrogen inlet. The specific amounts of water, surfactant, monomers, and initiator used in Examples 1 to 3 are shown in Table 1. These ingredients were added according to the following procedure. 715 g of deionized water, 12 g of DBS, and 38 g of a 15.2% aqueous solution of Na2CO3 were added to the reaction flask with stirring under a nitrogen purge. The flask was then heated to 86° C. In a different flask from the reaction flask, a monomer emulsion was prepared by adding 556 g of deionized water, 39.6 g of DBS, 412 g of BA, 1042 g of MMA, and 14.6 g of MAA. The contents were emulsified with a homogenizer. Upon reaching a temperature of 86° C., a polymer dispersion was added to the reaction flask. The initiator (3.86 g of APS in 33 g of deionized water) was then added to the reaction flask. The monomer emulsion was fed over a period of 100 minutes. An initiator solution (2.89 g APS in 91 g of deionized water) was cofed with the monomer emulsion over a period of 100 minutes. The reaction mixture was maintained at 83-85° C.

throughout the period of co-feeds, and for an additional 30 minutes after the end of the co-feeds. The reaction mixture was then cooled to 65° C. Un-reacted monomer was reduced by the addition of ferrous sulfate, tertiary butyl hydroperoxide, and isoascorbic acid. The reaction was cooled to 35° C., and neutralized with ammonium hydroxide. The polymer was passed through a filter cloth to remove any coagulum. The particle size, weight percent solids, pH and glass transition temperature each polymer are reported in Table 2.

ferrous sulfate, ethylenediaminetetraacetic acid, tertiary butyl hydroperoxide, and isoascorbic acid. The reaction was cooled to 35° C., and neutralized with ammonium hydroxide. The polymer was passed through a filter cloth to remove any coagulum. The final product was 144 nm, 45.1 weight percent solids, with a pH of 6.5. The number average molecular weight was 23,681; and the weight average molecular weight was 38,443. The polymer had a glass transition temperature of 54° C.

TABLE 1

Preparation of High Molecular Weight Polymers

| Example | H₂O (g) | Surf. (g)[1] | Salt (g)[3] | H₂O (g) | Surf. (g)[2] | BA (g) | MMA (g) | Sty (g) | MAA (g) | Init (g)[4] | Init. (g)[5] | Additive[6] |
|---|---|---|---|---|---|---|---|---|---|---|---|---|
| B1 | 715 | 12 | 5.04 | 556 | 39.6 | 412 | 1042 | 0 | 14.6 | 3.86 | 2.89 | 0 |
| B2 | 300 | 9.4[7] | 2.5 | 350 | 7.1[7] | 203 | 353 | 188 | 7.5 | 2.5 | 0.5 | 0 |
| B3 | 358 | 0 | 2.5 | 278 | 12.4 | 441 | 287 | 0 | 7.4 | 1.3 | 1.44 | 22.0 |

[1]DBS for reactor charge
[2]DBS for monomer charge
[3]Na₂CO₃
[4]APS for reactor charge
[5]APS for reactor charge
[6]Polymer dispersion, 45% solids, 95 nm
[7]Ethoxylate lauryl sulfate, sodium salt

TABLE 2

Characterization of High Molecular Weight Polymers

| Example | Particle Size | Wt. % Solids | pH | Tg |
|---|---|---|---|---|
| B1 | 133 | 48.0 | 9.2 | 65 |
| B2 | 128 | 45.0 | 6.4 | 61, 118 |
| B3 | 400 | 45.1 | 8.5 | −1 |

EXAMPLE B4

Preparation of Low Molecular Weight Polymers by Emulsion Polymerization

The polymerization was conducted in a 3-liter, four neck round bottom reaction flask equipped with a mechanical stirrer, temperature control device, condenser, monomer feed line, initiator feed line, and a nitrogen inlet. These ingredients were added according to the following procedure. 300 g of deionized water, 129.4 g of ethoxylated lauryl sulfate, and 15.5 g of a 16.1% aqueous solution of Na2CO3 were added to the reaction flask with stirring under a nitrogen purge. The flask was then heated to 85° C.

In a different flask from the reaction flask, a monomer emulsion was prepared by adding 350 g of deionized water, 7.1 g of ethoxylated lauryl sulfate, 203 g of BA, 353 g of MMA, 188 g of Sty, 7.5 g of MAA, and 7.5 g of NDDM. The contents were emulsified with a homogenizer. Upon reaching a temperature of 85° C., 69 g of an BA/MMA/MAA emulsion polymer were added to the reactor. Initiator (2.5 g of APS in 13 g of deionized water) was added to the reaction flask. The monomer emulsion was fed over a period of 120 minutes. An initiator solution (0.5 g APS in 50 g of deionized water) was co-fed with the monomer emulsion over the 120 minutes. The reaction mixture was maintained at 83-85° C. throughout the period of co-feeds, and for an additional 20 minutes after the end of the co-feeds. The reaction mixture was then cooled to 70° C. Un-reacted monomer was reduced by the addition of

EXAMPLES B5-B7

Preparation of Low Molecular Weight Polymers in the Presence of High Molecular Weight Polymer by Emulsion Polymerization The polymerization was conducted in a 5-liter, four neck round bottom reaction flask equipped with a mechanical stirrer, temperature control device, condenser, monomer feed line, initiator feed line, and a nitrogen inlet. In the case of Example B5, the ingredients were added according to the following procedure. 715 g of deionized water, 12 g of DBS, and 38 g of a 13.2% aqueous solution of Na₂CO₃ were added to the reaction flask with stirring under a nitrogen purge. The flask was then heated to 86° C. In a different flask from the reaction flask, a monomer emulsion was prepared by adding 334 g of deionized water, 23.8 g of DBS, 247 g of BA, 625 g of MMA, 8.9 g of MAA. The contents were emulsified with a homogenizer. In another flask a second monomer emulsion was prepared by adding 260 g of deionized water, 15.8 g of DBS, 354 g of BA, 229 g of MMA, 5.9 g of MAA, and 99.6 g of NDDM. These contents were also emulsified with a homogenizer. Upon reaching a temperature of 85° C., a polymer dispersion was added to the reaction flask. The initiator (3.86 g of APS in 33 g of deionized water) was added to the reaction flask. The first monomer emulsion was fed over a period of 60 minutes. An initiator solution (2.89 g APS in 91 g of deionized water) was co-fed with the monomer emulsions over 100 minutes. When the first monomer emulsion feed was completed, 50 g of deionized water was rinsed trough the feed lines. Methyl-beta cyclodextrin was then added to the reaction flask. Immediately thereafter, the second monomer emulsion was fed over a period of 40 minutes. The reaction mixture was maintained at 83-85° C. throughout the period of co-feeds, and for an additional 30 minutes after the end of the co-feeds. The reaction mixture was then cooled to 70° C. Un-reacted monomer was reduced by the addition of ferrous sulfate, tertiary butyl hydroperoxide, and isoascorbic acid. The reaction was cooled to 35° C., and neutralized with ammonium hydroxide. The polymer was passed through a filter cloth to remove any coagulum. The specific amounts of water, surfactant, monomers, and initiator used in this procedure for Examples 5 through 7 are shown in Table 3.

TABLE 3

Preparation of Low Molecular Weight Polymers in Presence of High Molecular Weight Polymers

|  | Example B5 | Example B6 | Example B7 |
|---|---|---|---|
| Reactor Charges | | | |
| H$_2$O (g) | 715 | 358 | 358 |
| Surfactant[1](g) | 12 | 0 | 0 |
| Salt[2](g) | 5 | 2.5 | 2.5 |
| Additive[3] | 0 | 22.0 | 22.0 |
| First Monomer Emulsion | | | |
| H$_2$O (g) | 334 | 167 | 167 |
| Surfactant[1](g) | 23.8 | 4.5 | 4.5 |
| BA | 247 | 177 | 207 |
| MMA | 625 | 260 | 304 |
| MAA | 8.9 | 4.5 | 5.3 |
| Second Monomer Emulsion | | | |
| H$_2$O (g) | 260 | 111 | 111 |
| Surfactant[1](g) | 15.8 | 7.9 | 7.9 |
| BA | 354 | 139 | 104 |
| MMA | 229 | 79 | 60 |
| Sty | 0 | 74 | 55 |
| MAA | 5.9 | 3.0 | 2.2 |
| n-Dodecylmercaptan | 65.7 | 58.7 | 44.1 |
| Methyl-Beta-Cyclodextrin[4] | 0 | 5.8 | 5.8 |
| Initiator[5] | 3.86 | 1.30 | 1.3 |
| Cofeed Initiator[5] | 2.89 | 1.44 | 1.44 |

[1]DBS.
[2]Na$_2$CO$_3$
[3]Polymer dispersion, 45% solids, 95 nm
[4]50% active solution in water
[5]APS Examples B5, B6 and B7 each displayed two molecular weight modes when analyzed by SEC. The results appear in Table 4.

TABLE 4

Characterization Of Copolymer Compositions

| Example | Weight % Solids | Particle Size (nm) | Mw | Mn | Tg (DSC) |
|---|---|---|---|---|---|
| B5 | 47.9 | 115 | 4235, 362,000 | 2601, 193,000 | 10 |
| B6 | 45.6 | 415 | 2415, 333,000 | 1444, 190,000 | NM |
| B7 | 45.7 | 431 | 2937, 382,000 | 1571, 133,000 | 3 |

Test Methods for Evaluation of Aqueous Coating Compositions

Gloss: A coating composition is drawn down on a Leneta chart (The Leneta Company, Mahwah, N.J.) using a 3-mil Bird film applicator. The sample is dried at 75° F. and 50% relative humidity. 20° and 60° gloss is measured using a BYK-Gardner Haze-Gloss meter (BYK Gardner, Columbia, Md.).

Pendulum Hardness: A coating composition is drawn down on an untreated aluminum panel using a 5-mil block applicator. The sample is dried at 75° F. and 50% relative humidity. Pendulum hardness was measured using a Byk Mallinckrodt Konig Pendulum Hardness Tester (BYK Gardner, Columbia, Md.). The number of swings is multiplied by a factor of 1.4 to obtain the pendulum hardness.

Pigment Grinds were provided for the Example Paints according to Table 5. All weights are in grams.

TABLE 5

Pigment Grinds For Aqueous Coating Compositions

| Material | Comparatives T1 and T4, Examples T1, T2, T3, and T4, T13, T14, T15, T16 | Comparatives T2, T3, T5, T6, and T7, Examples T5, T6, T7, T8, T9, T10, T11, and T12 |
|---|---|---|
| Combine the following materials in a Cowles mixer | | |
| Water | 12.5 | 25.00 |
| Tamol ® 2001 | 3.65 | 7.3 |
| Ammonia (28%) | 0.5 | 1.00 |
| Surfynol CT-111 | 0.5 | 1.00 |
| Tego Foamex 810 | 0.25 | 0.5 |
| Ti-Pure ® R-706 | 51.08 | 102.17 |

Tables 6, 7, 8, and 9 describe the other formulation components which were added to the grind (Let Downs) to form aqueous coating compositions used for evaluation of the emulsion polymer examples.

TABLE 6

Let Down Compositions For Aqueous Coating Compositions

| Add the following materials with low shear mixing | Comparative T1 | Example T1 | Comparative T4 | Example T4 |
|---|---|---|---|---|
| Water | 6.25 | 6.25 | 6.25 | 6.25 |
| Example K2 | 54.32 | 54.32 | 95.06 | 54.32 |
| Example K1 | 40.49 | | 40.49 | |
| Example K3 | 43.62 | | | |
| Example K4 | | 85.17 | | 85.17 |
| Ammonia (28%) | 0.6 | 0.6 | 0.4 | 0.6 |
| Tego Foamex 810 | 0.25 | 0.25 | 0.25 | 0.25 |
| Tergitol 15-S-40 | 1.5 | 1.5 | 1.5 | 1.5 |
| Acrysol ® RM-2020 NPR | 10.0 | 10.0 | 7.0 | 10.0 |
| Acrysol ® RM-8W | 2.4 | 2.3 | 2.6 | 1.8 |
| Water | 27.1 | 27.2 | 33.8 | 27.7 |

TABLE 7

Let Down Compositions For Aqueous Coating Compositions

| Add the following materials with low shear mixing | Comparative T2 | Example T2 | Comparative T3 | Example T3 | Comparative T5 | Example T5 | Comparative T6 |
|---|---|---|---|---|---|---|---|
| Water | 12.5 | 6.25 | 12.5 | 6.25 | 12.5 | 12.5 | 12.5 |
| Example B3 | 247.37 | 113.62 | 222.54 | 92.89 | 247.37 | | 222.54 |
| Example B1 | 29.94 | | 54.48 | | | | |
| Example B5 | | 24.97 | | 45.50 | | | |
| Example B2 | | | | | 31.93 | 31.93 | 58.11 |
| Example B6 | | | | | | 256.09 | |
| Ammonia (28%) | 0.2 | 0.2 | 0.3 | 0.2 | 0.3 | 0.4 | 0.3 |
| Ethylene Glycol | 7.7 | 3.85 | 7.7 | 3.85 | 7.7 | 7.7 | 7.7 |
| Tego Foamex 810 | 0.5 | 0.25 | 0.5 | 0.25 | 0.5 | 0.5 | 0.5 |
| Tergitol 15-S-40 | 3.0 | 1.5 | 3.0 | 1.5 | 3.0 | 3.0 | 3.0 |
| Acrysol ® RM-2020 NPR | 20.0 | 10.0 | 20.0 | 10.0 | 20.0 | 20.0 | 20.0 |
| Acrysol ® RM-8W | 10.7 | 6.0 | 8.1 | 3.6 | 7.8 | 10.0 | 7.6 |
| Water | 40.7 | 19.8 | 43.8 | 22.7 | 41.6 | 31.0 | 40.9 |

TABLE 8

Let Down Compositions For Aqueous Coating Compositions

| Add the following materials with low shear mixing | Example T6 | Example T7 | Example T8 | Example T9 | Example T10 | Example T11 | Example T12 |
|---|---|---|---|---|---|---|---|
| Water | 12.5 | 12.5 | 12.5 | 12.5 | 12.5 | 12.5 | 12.5 |
| Example B2 | 58.11 | | | 31.93 | 58.11 | | |
| Example B4 | | 31.86 | 57.98 | | | 31.86 | 57.98 |
| Example B6 | 230.38 | 256.09 | 230.38 | | | | |
| Example B7 | | | | 254.40 | 228.87 | 254.40 | 228.87 |
| Ammonia (28%) | 0.3 | 0.3 | 0.2 | 0.3 | 0.3 | 0.3 | 0.3 |
| Ethylene Glycol | 7.7 | 7.7 | 7.7 | 7.7 | 7.7 | 7.7 | 7.7 |
| Tego Foamex 810 | 0.5 | 0.5 | 0.5 | 0.5 | 0.5 | 0.5 | 0.5 |
| Tergitol 15-S-40 | 3.0 | 3.0 | 3.0 | 3.0 | 3.0 | 3.0 | 3.0 |
| Acrysol ® RM-2020 NPR | 20.0 | 20.0 | 20.0 | 20.0 | 20.0 | 20.0 | 20.0 |
| Acrysol ® RM-8W | 7.1 | 9.9 | 8.6 | 10.2 | 7.5 | 8.3 | 8.2 |
| Water | 33.9 | 31.3 | 32.6 | 32.5 | 34.9 | 34.5 | 34.4 |

TABLE 9

Let Down Compositions For Aqueous Coating Compositions

| Add the following materials with low shear mixing | Example T13 | Example T14 | Example T15 | Example T16 |
|---|---|---|---|---|
| Water | 6.25 | 6.25 | 6.25 | 6.25 |
| Example K5 | 54.32 | 54.32 | 54.32 | |
| Example K6 | 85.17 | | | 85.17 |
| Example K7 | | 85.17 | | |
| Example K8 | | | 85.17 | |
| Example K2 | | | | 54.32 |
| Ammonia (28%) | 0.6 | 0.6 | 0.4 | 0.6 |
| Tego Foamex 810 | 0.25 | 0.25 | 0.25 | 0.25 |
| Tergitol 15-S-40 | 1.5 | 1.5 | 1.5 | 1.5 |
| Acrysol ® RM-2020 NPR | 10.0 | 10.0 | 7.0 | 10.0 |
| Acrysol ® RM-8W | 2.4 | 2.3 | 2.6 | 1.8 |
| Water | 27.1 | 27.2 | 33.8 | 27.7 |

TABLE 10

Evaluation of Aqueous Coating Compositions

| Paint | | | Gloss (20/60) 7 day | Pendulum Hardness 1 day 7 day |
|---|---|---|---|---|
| Example T1 | 40% Example K2 | 60% Example K4 | 49/80 | 18.2 19.6 |
| Comparative T1 | 40% Example K2 | 30% Example K1 30% Example K3 | 51/80 | 9.8 12.6 |

Comparison of Example T1 with Comparative T1 demonstrates the superior hardness development of an aqueous coating composition formulated with inventive dispersion Example K4, where the low molecular weight polymer (C) was polymerized in the presence of a high molecular polymer, to a comparative example where an equal quantity of (C) is formed separately and blended into the aqueous coating composition.

TABLE 11

Evaluation of Aqueous Coating Compositions

| Paint | | | Gloss (20/60) 1 day | Pendulum Hardness 1 day 7 day |
|---|---|---|---|---|
| Comparative T2 | 89% Example B3 | 11% Example B1 | 34/72 | 9.8 12.6 |
| Comparative T3 | 80% Example B3 | 20% Example B1 | 28/69 | 11.2 14.0 |
| Example T2 | 81.7% Example B3 | 18.3% Example B5 | 52/82 | 8.4 11.2 |
| Example T3 | 66.7% Example B3 | 33.3% Example B5 | 42/77 | 11.2 15.4 |
| Comparative T4 | 70% Example K2 | 30% Example K1 | 18/60 | 12.6 12.6 |
| Example T4 | 40% Example K2 | 60% Example K4 | 52/80 | 14.0 15.4 |

Example T2 and Comparative T2, Example T3 and Comparative T3, Example T4 and Comparative T4 provide comparisons of the performance of paints formulated with inventive and Comparative dispersions when equal quantities of hard, high molecular polymer are present. Paints formulated with inventive dispersions demonstrate superior gloss performance.

TABLE 12

Evaluation of Aqueous Coating Compositions

| Paint | | | Gloss (20/60) 1 day | Pendulum Hardness 1 day 7 day |
|---|---|---|---|---|
| Comparative T5 | 11% Example B2 | 89% Example B3 | 32/72 | 11.2 12.6 |
| Comparative T6 | 20% Example B2 | 80% Example B3 | 24/66 | 12.6 15.4 |
| Comparative T7 | 11% Example B4 | 89% Example B3 | 33/73 | 12.6 12.6 |
| Example T5 | 11% Example B2 | 89% Example B6 | 43/80 | 9.8 11.2 |
| Example T6 | 20% Example B2 | 80% Example B6 | 48/83 | 11.2 14.0 |
| Example T7 | 11% Example B4 | 89% Example B6 | 65/88 | 8.4 9.8 |
| Example T8 | 20% Example B4 | 80% Example B6 | 66/88 | 9.8 12.6 |
| Example T9 | 11% Example B2 | 89% Example B7 | 43/80 | 14 15.4 |
| Example T10 | 20% Example B2 | 80% Example B7 | 33/74 | 15.4 21.0 |
| Example T11 | 11% Example B4 | 89% Example B7 | 53/85 | 11.2 15.4 |
| Example T12 | 20% Example B4 | 80% Example B7 | 47/81 | 14 18.2 |

The invention claimed is:

1. An aqueous polymer dispersion comprising polymer particles (A), polymer particles (B) and at least one low molecular weight polymer (C) where,
   a) polymer particles (A) comprise high molecular weight polymer pA having Mw >50,000 and acid number of from 0 to 160,
   b) polymer particles (B) comprise high molecular weight polymer pB having Mw >50,000 and acid number of from 0 to 160,
   c) (C) is an addition polymer having a calculated Tg,(low) of less than 10° C., Mn <10,000, acid number of from 0 to 80, formed by the polymerization of at least one ethylenically unsaturated nonionic monomer, wherein
   d) the weight percentage of pA, based on the total weight of polymer in said dispersion, is at least 5%,
   e) the weight percentage of (C) is at least 5%, based on the total weight of pA,
   f) pA is formed in the presence of (C) or (C) is formed in the presence of pA,
   g) polymer particles (A) differ from polymer particles (B) in at least one of, particle size, Tg, acid number, composition, molecular weight, molecular weight distribution, polymer chain structure,
   h) the at least one ethylenically unsaturated nonionic monomer is a (meth)acrylic ester, styrene, a substituted styrene, butadiene, a vinyl ester, a vinyl monomer, vinylidene chloride, or a combination comprising at least one of the foregoing monomers, and
   i) high molecular weight polymers pA and pB each have a ratio of Mw/Mn of 1.75 to 6.5.

2. An aqueous polymer dispersion as in claim 1 formed by the blending of an aqueous dispersion comprising pA and (C) with an aqueous dispersion comprising pB.

3. An aqueous polymer dispersion as in claim 1 wherein pB is formed by polymerization of at least one ethylenically unsaturated monomer in the presence of an aqueous dispersion comprising pA and (C).

4. An aqueous polymer dispersion as in claim 1 wherein the Mn of C is <7,500.

5. An aqueous polymer dispersion as in claim 1 wherein the Mn of C is <4,000.

6. An aqueous polymer dispersion as in claim 1 wherein the calculated Tg∞ of pA differs from the calculated Tg∞ of pB by at least 10° C.

7. An aqueous polymer dispersion as in claim 1 wherein the number average particle size of polymer particles (A) differs form that of polymer particles (B) by at least 50 nanometers.

8. An aqueous polymer dispersion as in claim 1 wherein (C) is formed in the presence of a macromolecular organic compound having a hydrophobic cavity.

9. An aqueous polymer dispersion comprising polymer particles (A), polymer particles (B) and at least one low molecular weight polymer (C) wherein,
   a) polymer particles (A) comprise high molecular weight polymer pA having Mw >50,000 and acid number of from 0 to 160, and calculated Tg∞ of at least 40° C.,
   b) polymer particles (B) comprise high molecular weight polymer pB having Mw >50,000 and acid number of from 0 to 160, acid number of from 0 to 160 and calculated Tg∞ of −10 to 30° C.,
   c) C is an addition polymer having a calculated Tg,(low) of less than 10° C., Mn <10,000, acid number of from 0 to 80, formed by the polymerization of at least one ethylenically unsaturated nonionic monomer, wherein
   d) the weight percentage of pA, based on the total weight of polymer in said dispersion, is at least 5%,
   e) the weight percentage of (C), based on the total weight of polymer in the dispersion, is at least 1%,
   f) the at least one ethylenically unsaturated nonionic monomer is a (meth)acrylic ester, styrene, a substituted styrene, butadiene, a vinyl ester, a vinyl monomer, vinylidene chloride, or a combination comprising at least one of the foregoing monomers, and
   g) the ratio of the weight of polymers pB and (C) to the weight of polymer pA is from 2:3 to 19:1.

10. A coating composition comprising an aqueous dispersion according to any of claims 1 to 9.

11. An aqueous dispersion as in claim 1 wherein the acid number of pA and pB differ by at least a value of five.

12. An aqueous dispersion as in claim 1 wherein pA is comprised of the polymerized residues of at least one monomer not present in pB or pB is comprised of the polymerized residues of at least one monomer not present in pA.

13. An aqueous dispersion as in claim 1 wherein pA is formed from a monomer mixture in which the weight percentage of a given monomer (X), based on the total weight of the monomers used to form pA, is different by at least 5% from the weight percentage of a given monomer (X), based on the total weigh of the monomer used to form pB.

14. An aqueous dispersion as in claim 1 wherein the Mw of pA and pB differ by more than 100,000.

15. An aqueous dispersion as in claim 1 wherein the ratio Mw/Mn of pA differs from that of pB by at least 20%.

16. An aqueous dispersion as in claim 1 wherein the pA and pB differ in polymer chain structure.

* * * * *